United States Patent
De Traglia Amancio Filho et al.

(10) Patent No.: US 9,925,717 B2
(45) Date of Patent: Mar. 27, 2018

(54) METHOD FOR CONNECTING A SURFACE-STRUCTURED WORKPIECE AND A PLASTIC WORKPIECE

(71) Applicant: Helmholtz-Zentrum Geesthacht Zentrum für Material-und Küstenforschung GmbH, Geesthacht (DE)

(72) Inventors: Sergio De Traglia Amancio Filho, Börnsen (DE); Eduardo Etzberger Feistauer, Geesthacht (DE); Jorge Fernandez Dos Santos, Tespe (DE)

(73) Assignee: Helmholtz-Zentrum Geesthacht Zentrum für Material—und Künforschung GmbH, Geesthacht (DE)

( * ) Notice: Subject to any disclaimer, the term of this patent is extended or adjusted under 35 U.S.C. 154(b) by 221 days.

(21) Appl. No.: 15/063,771

(22) Filed: Mar. 8, 2016

(65) Prior Publication Data

US 2016/0297138 A1  Oct. 13, 2016

(30) Foreign Application Priority Data

Apr. 10, 2015 (EP) ..................... 15163163

(51) Int. Cl.
    *B32B 37/00* (2006.01)
    *B29C 65/08* (2006.01)
    (Continued)

(52) U.S. Cl.
    CPC .......... *B29C 65/08* (2013.01); *B29C 45/0053* (2013.01); *B29C 65/081* (2013.01);
    (Continued)

(58) Field of Classification Search
    CPC ..... B29C 65/08; B29C 65/081; B29C 65/562; B29C 65/64; B29C 65/645;
    (Continued)

(56) References Cited

U.S. PATENT DOCUMENTS 4,358,328 A    11/1982   Pearson
5,589,015 A * 12/1996   Fusco .................. B32B 5/26
                                                                    156/73.1
(Continued)

FOREIGN PATENT DOCUMENTS

DE    102009017776 A1   10/2010
EP      02468436 A1    6/2012
(Continued)

OTHER PUBLICATIONS

Communication dated Sep. 24, 2015, from the European Patent Office for corresponding European application No. EP 15163163.7.

*Primary Examiner* — James Sells
(74) *Attorney, Agent, or Firm* — Harness, Dickey & Pierce, P.L.C.

(57) ABSTRACT

A method for connecting a surface-structured workpiece (SSW) and a plastic workpiece using a joining tool with a sonotrode. The method includes: positioning the SSW and the plastic workpiece on an anvil such that a structured contact surface section (SCSS) of the SSW faces a contact surface of the plastic workpiece; positioning the sonotrode in contact with an outer surface of the SSW that is opposite to the SCSS; and applying pressure to the sonotrode and/or the anvil perpendicular to the contact surface to hold the workpieces fixed between the anvil and the sonotrode and applying ultrasonic vibrations to the workpieces by the sonotrode for a predetermined period of time to induce softening of the plastic workpiece and penetrate pin-like elements of the SCSS into the plastic workpiece.

16 Claims, 6 Drawing Sheets

Figure 1:
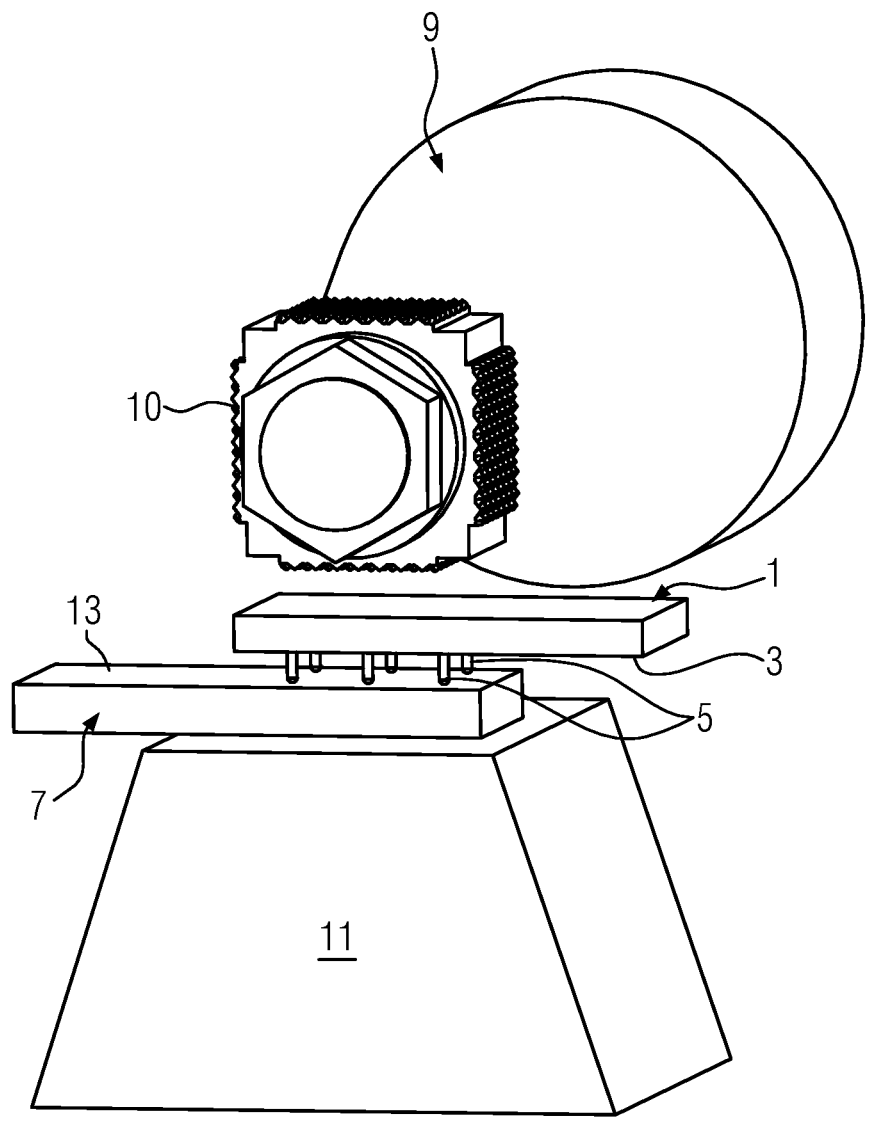

(51) Int. Cl.
  *B29C 65/56* (2006.01)
  *B29C 65/64* (2006.01)
  *B29C 65/00* (2006.01)
  *B29C 45/00* (2006.01)
  B29L 31/30 (2006.01)

(52) U.S. Cl.
  CPC ............ *B29C 65/562* (2013.01); *B29C 65/64* (2013.01); *B29C 65/645* (2013.01); *B29C 66/112* (2013.01); *B29C 66/1122* (2013.01); *B29C 66/131* (2013.01); *B29C 66/30221* (2013.01); *B29C 66/30321* (2013.01); *B29C 66/30341* (2013.01); *B29C 66/43* (2013.01); *B29C 66/43441* (2013.01); *B29C 66/472* (2013.01); *B29C 66/524* (2013.01); *B29C 66/5241* (2013.01); *B29C 66/5244* (2013.01); *B29C 66/52441* (2013.01); *B29C 66/52451* (2013.01); *B29C 66/545* (2013.01); *B29C 66/721* (2013.01); *B29C 66/742* (2013.01); *B29C 66/8322* (2013.01); *B29C 65/082* (2013.01); *B29C 66/7422* (2013.01); *B29C 66/949* (2013.01); *B29C 66/9517* (2013.01); *B29L 2031/30* (2013.01); *B29L 2031/3064* (2013.01); *B29L 2031/3076* (2013.01)

(58) Field of Classification Search
  CPC ............... B29C 45/0053; B29C 66/112; B29C 66/1122; B29C 66/131; B29C 66/80; B65B 51/225
  USPC ........................................................ 156/73.1
  See application file for complete search history.

(56) References Cited

U.S. PATENT DOCUMENTS

| | | |
|---|---|---|
| 7,234,625 B2 | 6/2007 | Loitz et al. |
| 7,575,149 B2 | 8/2009 | De Traglia Amancio Filho et al. |
| 7,607,558 B2 | 10/2009 | Loitz et al. |
| 7,780,432 B2 | 8/2010 | De Traglia Amancio Filho et al. |
| 7,882,998 B2 | 2/2011 | Roos et al. |
| 7,954,691 B2 | 6/2011 | Roos et al. |
| 8,025,827 B2 | 9/2011 | De Traglia Amancio Filho et al. |
| 8,518,198 B2 | 8/2013 | de Traglia Amancio Filho et al. |
| 8,567,032 B2 | 10/2013 | de Traglia Amancio Filho et al. |
| 8,714,431 B2 | 5/2014 | Roos et al. |
| 8,893,951 B2 | 11/2014 | dos Santos et al. |
| 2006/0006211 A1 | 1/2006 | Loitz et al. |
| 2006/0059476 A1 | 3/2006 | McIntosh et al. |
| 2006/0288553 A1* | 12/2006 | Hall ........................ B29C 65/08 29/407.1 |
| 2006/0288554 A1* | 12/2006 | Hall ........................ B29C 65/08 29/407.1 |
| 2006/0289603 A1 | 12/2006 | Zettler et al. |
| 2006/0289604 A1 | 12/2006 | Zettler et al. |
| 2011/0131784 A1 | 6/2011 | de Traglia Amancio Filho et al. |
| 2012/0153549 A1 | 6/2012 | Milagres Ferri et al. |
| 2016/0067818 A1 | 3/2016 | Hutsch et al. |

FOREIGN PATENT DOCUMENTS

| | | |
|---|---|---|
| FR | 1519111 A | 3/1968 |
| JP | S58-168679 A | 10/1983 |
| JP | H03-226456 A | 10/1991 |

* cited by examiner

METHOD FOR CONNECTING A SURFACE-STRUCTURED WORKPIECE AND A PLASTIC WORKPIECE

CROSS-REFERENCE TO RELATED APPLICATIONS

This application claims the benefit and priority of European Patent Application Serial No. 15163163.7, filed Apr. 10, 2015. The entire disclosure of the above application is incorporated by reference as if fully set forth in its entirety herein.

FIELD

The present disclosure relates to a method for connecting a surface-structured workpiece and a plastic workpiece by means of a joining tool using ultrasonic vibrations.

BACKGROUND

The relevance of lightweight materials has increased in the fields of automotive, railway or aviation technology as well in medical applications. Devices, which are a combination of metal or metal alloy and plastic workpieces, are often used in order to significantly reduce weight while maintaining desired properties, such as stiffness, corrosion resistance, impermeability or chemical resistance. In particular fiber reinforced polymers (FRP) are used in combination with lightweight metals to provide materials with excellent mechanical properties to industry. In this regard it is the challenge for technical development to provide reliable joining techniques, in particular in order to join metal components with plastic components.

From the prior art it is known that metal/plastic hybrid structures can simply be achieved by mechanical fastening. This method normally allows for easy disassembly, inspection and recycling of the components. The mechanical engagement can be accomplished by bolts, screws, clamps or rivets. Nevertheless, these mechanical connectors involve further elements which increase the weight of the entire workpiece. In particular for applications in aviation technology this is disadvantageous, because minimizing the weight of each device is a major concern in this field. A further disadvantage of mechanical fastening of hybrid structures is the fact that high stress concentration levels are generated at the location of the connection, and that the connection itself may be a starting point for a crack in at least one of the components. In particular reinforced polymers can significantly be altered in their properties by introducing the necessary holes for mechanical connections. Especially, the in-plane strength of the reinforced polymer can be strongly decreased. Furthermore, mechanical connections require the use of sealants due to hermetic losses.

Another preferred method is to join metal/plastic hybrid structures by adhesive bonding. This method consists in applying an adhesive between metal and plastic partners and an external pressure and/or heat during curing of the adhesive. This method requires intensive surface preparation of the materials associated with multi-procedural steps and a long curing time, making this process quite complex, expensive and time-consuming. Further it is often questionable whether a joint formed by an adhesive only is sufficiently stable. This is why this method is often combined with mechanical fastening.

Whereas in case of connections between two metal components conventional welding techniques such as fusion-based or friction-based welding have proven to result in stable joints even in situations where only punctual connections are possible. However, these techniques cannot simply be employed in the case of metal/plastic connections. Usually the welding temperatures for metals are much higher than for thermoplastic material, and thermoset materials cannot be welded at all since these materials do not melt. Often a prior surface treatment is required which is time consuming. Moreover, welding is often connected with a high energy input, which may lead to the problem that the material in the vicinity of the welding point is significantly influenced and the material properties are altered.

Another newly developed method is friction spot joining, described in U.S. 2011/0131784 A1, in which frictional heat is used to plasticize the metal partner and to subsequently melt the plastic workpiece to form a punctual joining. But this method is suitable only for low elasticity modulus alloys such as magnesium and aluminum, so that this technique cannot be used for joints where the metal part is made for instance of stainless steel or titanium alloys, which require much more heat to plasticize the metal part, inducing excessive thermal degradation of the polymeric workpiece.

In newly developed approaches to largely increase mechanical performance of metal/plastic overlap joints, such as structural stability and out-of-plane mechanical properties, 3D reinforcements are produced on the metal surface. It has been shown that these structures can be produced by treating the metal surface by electron beam technology, which is used to locally melt the metal surface to create holes and protrusions and subsequently the polymer (or composite) is added layer by layer. However, the electron beam technology requires a vacuum environment, restricting the size of the metal workpiece to be treated. Furthermore, the required deposition or lamination process makes this technology extremely time consuming. Another disadvantage of this technology is related to the reduced reproducibility of the individual pin geometries, limited by the unsupported build up of the molten metal when forming the pins. Another option is to use electric-arc welding to weld micro-pins on the metallic partner surface. However, all fusion-based welding process problems related with solidification cracks, hydrogen embrittlement, and evaporation of alloying elements also affect mechanical properties here.

Therefore, it would be desirable to join damage-tolerant and crash-resistant surface-structured and plastic workpieces, in particular for forming a lap joint, in a manner that can easily be applied and which does not have one or more of the afore-mentioned drawbacks.

SUMMARY

This section provides a general summary of the disclosure, and is not a comprehensive disclosure of its full scope or all of its features.

In one form, the present disclosure provides a method for connecting a surface-structured workpiece and a plastic workpiece using a joining tool with an ultrasonic welding machine having a sonotrode. The surface-structured workpiece includes a structured contact surface section with pin-like elements that extend away from the structured contact surface section. The method includes: positioning the surface-structured workpiece and the plastic workpiece on an anvil such that the structured contact surface section faces a contact surface of the plastic workpiece; positioning the joining tool on the surface-structured workpiece so as to bring the sonotrode into contact with an outer surface of the surface-structured workpiece, the outer surface being opposite to the structured contact surface section; and applying a pressure to the sonotrode and/or the anvil perpendicular to the contact surface to hold the workpieces fixed between the anvil and the sonotrode and applying ultrasonic vibrations to the workpieces by the sonotrode for a predetermined period of time, so that softening of the plastic workpiece is induced and the pin-like elements penetrate into the plastic workpiece.

This method employs ultrasonic energy and pressure to join a surface-structured workpiece with integrated 3D anchoring surface features and a plastic workpiece by inserting the 3D anchoring surface features in the plastic workpiece, preferably made of thermoplastic and/or fiber reinforced polymer composite. Ultrasonic energy is applied by an ultrasonic welding machine which transfers the ultrasonic vibrations to the workpiece via a sonotrode. In particular, vibrations perpendicular or parallel to the contact plane can be applied or torsion-like motion may occur. Pressure can be applied externally by the ultrasonic welding machine and/or the anvil. This combination will initially create friction at the interface between the metallic anchoring elements and the polymeric material, resulting in softening of the polymeric workpiece. Subsequently, this allows the anchoring elements to be inserted into the abutting polymeric workpiece. The consolidated polymer matrix at the interface will adhere to the surface-structured workpiece increasing the mechanical interlocking.

In this regard it should be noted that the term surface-structured workpiece as used herein covers workpieces made of a metal only, a metal alloy or a mixture of a metal or metal alloy with a further material such as fibers, whiskers or other particles. Further, the surface-structured workpiece may also be formed of ceramics or fiber-reinforced polymers.

The pressure and ultrasonic vibrations may be removed and the sonotrode may be retracted after the connection has been formed.

The 3D surface features may be formed as pin-like elements comprising anchoring elements at their distal ends. Firstly, such pin-like geometry can be quite simple, so that the production of a surface section structure in this way does not complicate the entire production processes of the workpieces to an intolerable extent. If the pin-like elements comprise anchoring elements at their distal ends, i.e. there is at least an increase in the pin dimensions towards their distal ends transversely to the longitudinal direction of the pin, the stability of the connection between the pin-like elements inserted into the plastic workpiece and the plastic workpiece is further increased. These anchoring elements can be designed as conical or spherical or convex or arrow-like or hook-like heads. The stability is increased due to the fact that the softened polymer encloses the anchoring elements before solidification.

The pin-like elements can have a length of 1 to 5 mm in the direction perpendicular to the contact surface section and/or the structured contact surface section comprises between 3 to 10 pin-like elements per $cm^2$.

The method of the present disclosure can used with surface-structured workpieces which are formed of aluminum or an aluminum alloy or formed of magnesium or a magnesium alloy. These materials have a high impact in lightweight hybrid structures. Furthermore, this method is also particularly adapted to surface-structured workpieces formed of titanium or a titanium alloy. This material is frequently used in aviation technology due to its high mechanical stability. Of course this selection of possible materials is not intended to exclude a variety of other possible materials that this joining method can be used with.

Furthermore, the surface-structured workpiece may be produced by a metal injection molding method, which can include: forming a mixture by mixing a metal powder and/or metal alloy powder with a binder, shaping the mixture by injection moulding to give the resulting workpiece at least one structured surface section, with the structured surface section having pin-like elements, and sintering the structured workpiece, to form the shaped surface-structured workpiece having a structured surface section. The method of the present invention has proven to be particularly suitable to connect surface-structured workpieces produced in this way with plastic workpieces, as the injection moulding step involved allows for a simple way to form the pin-like elements during the production of the workpieces. It is merely required to use a mould being formed with recesses corresponding to the pin-like elements and there is no additional forming step required. Further details of this technology are described in EP 2 468 436 B1.

The method of the present disclosure has proven to be particularly suitable to connect surface-structured workpieces produced in this way with plastic workpieces, as the injection molding step involved allows for a simple way to form the pin-like elements during the production of the workpieces. It is merely required to use a mold that is formed with recesses corresponding to the pin-like elements and there is no additional forming step required. Further details of this technology are described in EP 2 468 436 B1.

The production of the surface-structured workpiece may further include: subjecting the structured workpiece to chemical binder removal, and subjecting the structured workpiece which has been subjected to chemical binder removal, to thermal binder removal before sintering the workpiece.

DRAWINGS

The drawings described herein are for illustrative purposes only of selected embodiments and not all possible implementations, and are not intended to limit the scope of the present disclosure.

Figure 2:
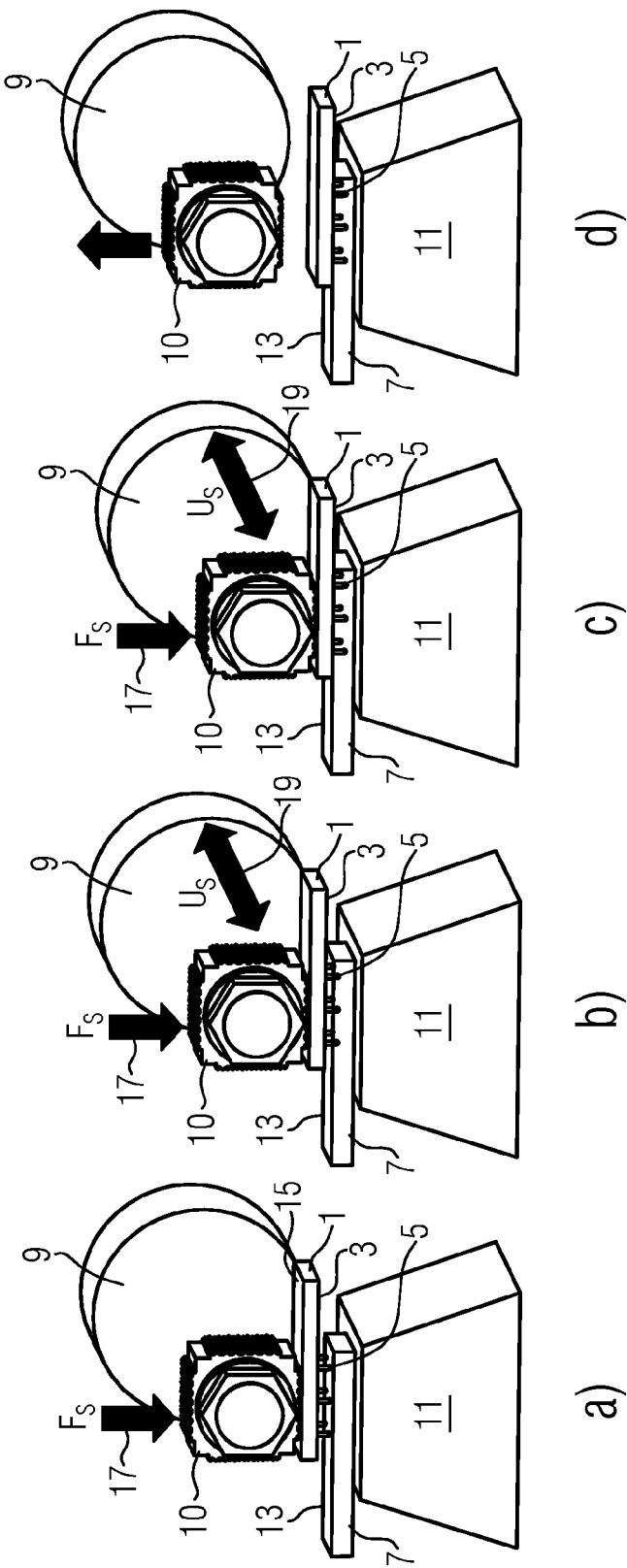
Figure 3:
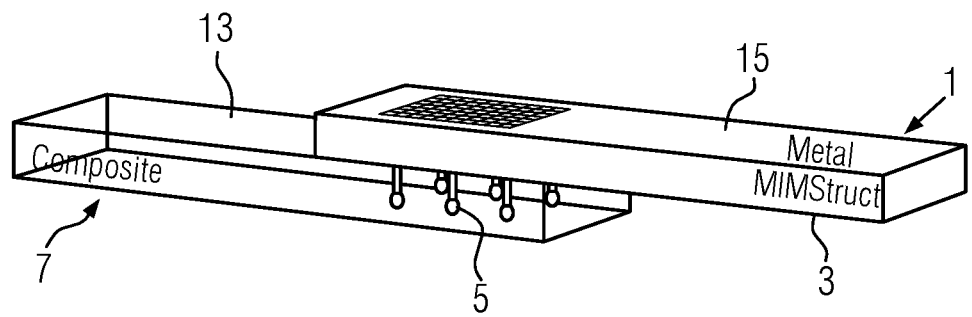
Figure 4:
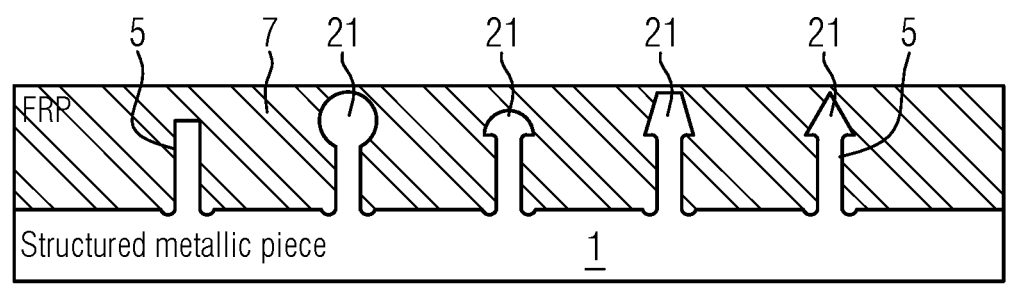
Figure 5:
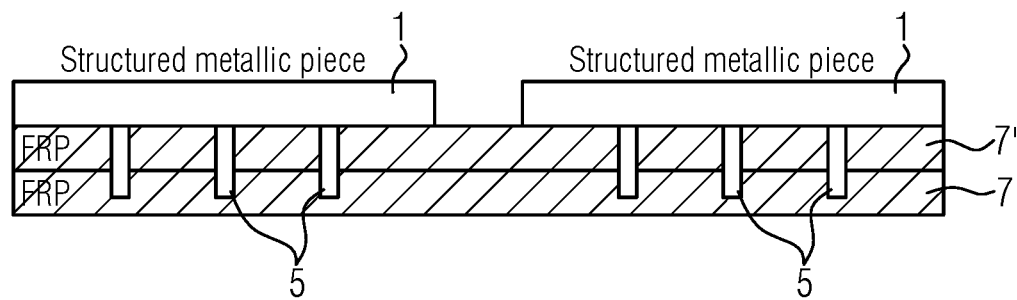
Figure 6:
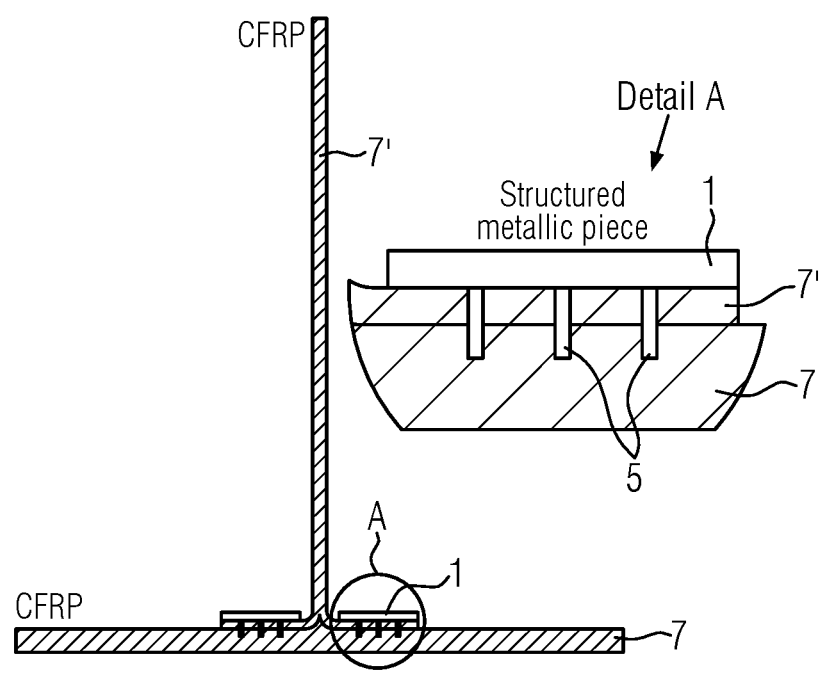
Figure 7:
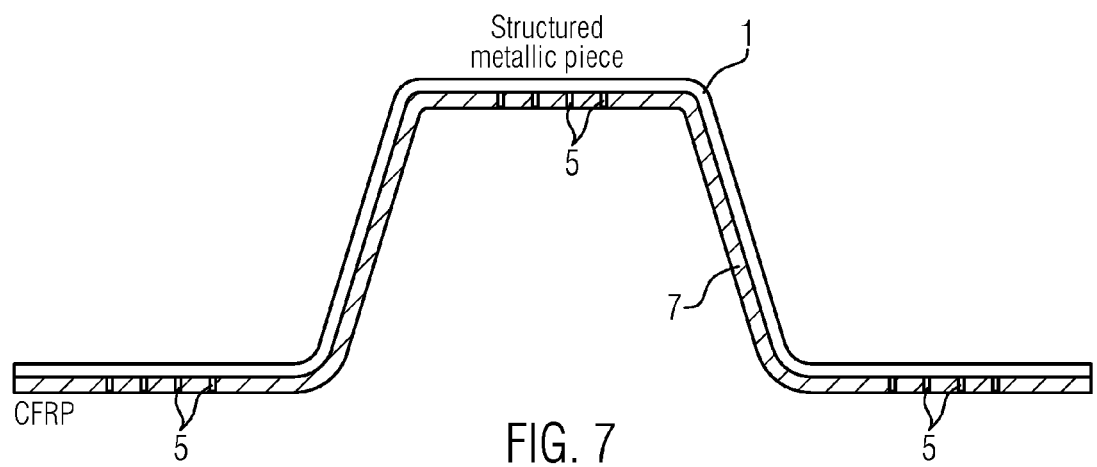
Figure 8:
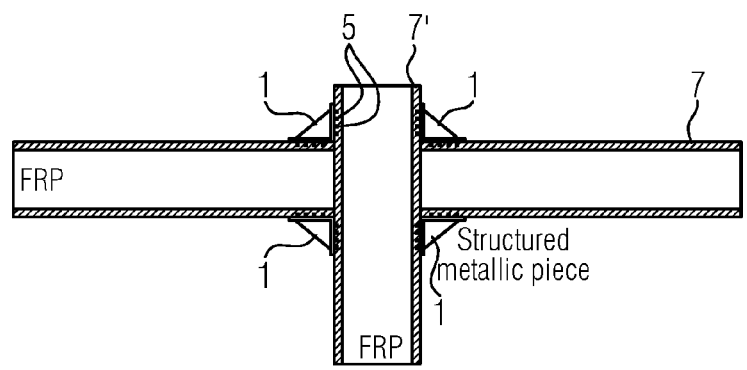
Figure 9:
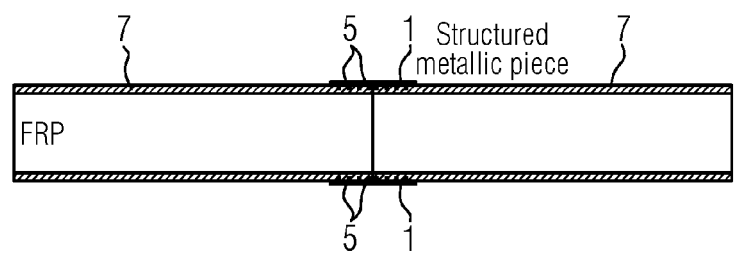
Figure 10:
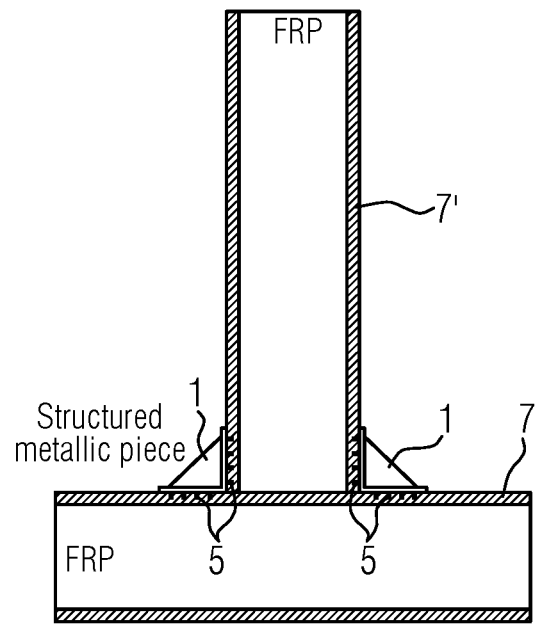
Figure 11:
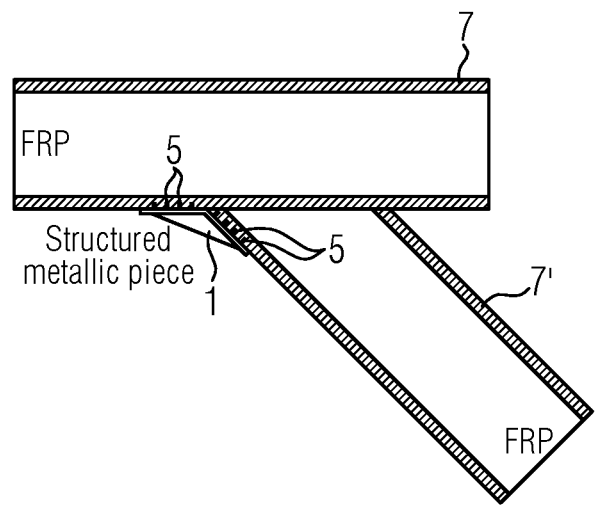

FIG. 1 is a schematic illustration of a device for performing method in accordance with the teachings of the present disclosure, FIG. 2 is a schematic illustration of an exemplary method conducted in accordance with the teachings of the present disclosure, FIG. 3 shows a schematic of a produced joint, FIG. 4 shows a sectional view of joints realized by different examples of the pin-like elements, FIG. 5 shows a schematic of a produced joint with an assembly of plastic workpieces, FIG. 6 shows a first example of the application of the method of the present invention, FIG. 7 shows a second example of the application of the method of the present invention, FIG. 8 shows a third example of the application of the method of the present invention, FIG. 9 shows a fourth example of the application of the method of the present invention, FIG. 10 shows a fifth example of the application of the method of the present invention and FIG. 11 shows a sixth example of the application of the method of the present invention.

Corresponding reference numerals indicate corresponding parts throughout the several views of the drawings.

DETAILED DESCRIPTION

As shown in FIG. 1, a device for performing a method in accordance with the teachings of the present disclosure is shown with which a surface-structured workpiece 1 comprising a structured contact surface section 3 with pin-like elements 5 that extend away from the structured contact surface section 3, and a plastic workpiece 7 can be connected with each other.

Optionally, the surface-structured workpiece 1 can be produced by a metal injection molding method, which can comprise the following steps: forming a mixture by mixing a metal powder and/or metal alloy powder with a binder, shaping the mixture by injection molding to give the resulting workpiece at least one structured surface section 3, with the structured surface section 3 having pin-like elements 5, and sintering the structured workpiece to form the shaped surface-structured workpiece 1 having a structured surface section 3.

In particular, this production method may further comprise: subjecting the structured workpiece to chemical binder removal; and subjecting the structured workpiece that has been subjected to chemical binder removal to thermal binder removal before sintering the workpiece.

However it is also conceivable that the surface-structured workpiece 1 is formed of aluminum or an aluminum alloy, magnesium or a magnesium alloy or titanium or a titanium alloy.

Furthermore, the plastic workpiece 7 can be formed of a fiber reinforced plastic material.

The device comprises a sonotrode 9 having a sonotrode tip 10 and an anvil 11, and the workpieces 1, 7 are arranged between the sonotrode 9 and the anvil 11 in such a way that the distal ends of the pin-like elements 5 of the structured contact surface section 3 of the surface-structured workpiece 1 are facing towards a contact surface 13 of the plastic workpiece 7.

Generally the sonotrode 9 is part of an ultrasonic welding system with the main components (not shown in FIG. 1) of an ultrasonic generator, which generates high frequency alternating voltage in a kilohertz-regime, a converter transforming this voltage into mechanical oscillations, usually due to the reversed piezoelectric effect, a booster typically increasing the oscillation amplitude to a range between 5 μm up to 50 μm, and the sonotrode 9 transferring the ultrasonic mechanical oscillation to the joining zone i.e. by direct contact with the surface-structured workpiece 1.

The method of the present disclosure can be divided into five stages illustrated as in FIG. 2.

Initially the workpieces 1, 7 are fixed between the anvil 11 and the sonotrode tip 10 with the pin-like structures 5 of the surface-structured workpiece 1 on top of the plastic workpiece 7, wherein the pin-like elements 5 touch the contact surface 13 of the plastic workpiece 7 (see Part a) of FIG. 2). The sonotrode tip 9 abuts on an upper surface 15 of the surface-structured workpiece 1 opposite the structured contact surface section 3 of the surface-structured workpiece 1 and a static pressure 17 is applied perpendicularly to the contact surfaces 3, 13 of the workpieces 1, 7, typically pneumatically. This pressure 17 is applied on the sonotrode 9 and/or the anvil 11, so that it presses the overlapping workpieces 1, 7 against each other during the joining process (see Part a) of FIG. 2).

The sonotrode 9 starts to vibrate with ultrasonic frequency 19 with a typical amplitude between 5 μm and 50 μm in a forward-backward movement parallel to the contact surfaces 3, 13 of the workpieces 1, 7 to be joined as shown in Part b) of FIG. 2. However, the method is not restricted to a vibrational movement parallel to the contact surfaces 3, 13. The method is also applicable with ultrasonic oscillations directed perpendicularly to the contact surfaces 3, 13 or with torsional movement of the sonotrode 9.

Set in motion by the ultrasonic vibration 19, the pin-like elements 5 interact with the contact surface 13 of the plastic workpiece 7 producing frictional heat. The pressure 17 and ultrasonic vibration 19 are maintained during a predetermined period of time, so that softening of the plastic workpiece 7 in the vicinity of the pin-like elements 5 is induced, in particular softening of the polymeric matrix of the fiber reinforced polymer workpiece 7, allowing further penetration of the pin-like elements 5 into the plastic workpiece 7 (see Part c) of FIG. 2).

By adjusting the period of time the sonotrode 9 vibrates, the amplitude of the vibrations and the amount of pressure 17, the frictional heat can be controlled and damage of the plastic workpiece 7 due to high thermal energy transfer can be avoided. Generally, the ultrasonic-based joining process is characterized by a low heat development during the process.

Finally the pressure 17 and ultrasonic vibrations 19 are removed and the sonotrode 9 is retracted from the now joined hybrid workpiece 1, 7 to release the latter (see Part d) of FIG. 2). The joining time can be shortened to typically less than five seconds. This significant reduction of time for direct assembly will also reduce the assembly costs compared to state-of-the-art assembly processes.

Finally, the pin-like elements 5 extend entirely in the plastic workpiece 7 so that the contact surfaces 3, 13 directly abut on each other, as it becomes more evident in FIG. 3. Thus, a bulk connection rather than just a laminar connection is formed and the mechanical stability in particular with respect to loads perpendicular to the contact surfaces 3, 13 is improved.

This effect is even more increased, if the pin-like elements 5 are designed not just with a mere cylindrical shape, but comprise anchoring elements 21 at their distal ends. FIG. 4 shows a sectional view through joined surface-structured-plastic workpieces 1, 7 with different types of anchoring elements 21 such as conical or spherical or convex or arrow-like shape. In such case the strength of the connection is even more improved due to the fact that the polymeric matrix of the plastic workpiece 7 completely encloses the anchoring elements 21 after being softened during the ultrasonic welding process, thereby producing a form fit when the plastic workpiece 7 solidifies.

As it is shown in FIG. 5, the described joining method can also be applied to a stack of plastic workpieces 7, 7'. If the size of the pin-like elements 5 is adapted to the thickness of a first plastic workpiece 7' (or a first stack of plastic workpieces) in such a way that they are larger than the thickness of the first plastic workpiece 7' (or stack of plastic workpieces) in the welding region, the pin-like elements 5 can entirely penetrate the first plastic workpieces 7' (or a stack of plastic workpieces) and finally protrude into a lowermost plastic workpiece 7 creating the above-described form fit connection.

The afore-mentioned method according to the present can be used to connect one or more plastic workpieces 7, 7' by means of a surface-structured workpiece 1.

A first example is depicted in FIG. 6 comprising a first plastic workpiece 7' having a T-shaped cross section and a second plastic workpiece 7.

In a second example shown in FIG. 7 a surface-structured workpiece 1 is employed as a reinforcement element for a fiber reinforced plastic workpiece 7 and the workpieces 1, 7 are connected by means of the above-described embodiment of the method of the present invention.

In FIGS. 8 to 11 examples are shown, in which primary structures formed of plastic workpieces 7, 7' are coupled by surface-structured workpieces 1.

In conclusion, those of skill in the art will appreciate that a method according to the teachings of the present disclosure can produce a connection between a surface-structured workpiece and one or more plastic workpieces having a high stability also in the direction perpendicular to the contact surface in a simple and quick manner.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for connecting a surface-structured workpiece and a plastic workpiece using a joining tool including a sonotrode, said surface-structured workpiece comprising a structured contact surface section, said structured contact surface section comprising pin-like elements extending away from the structured contact surface section, said method comprising:
    positioning the surface-structured workpiece and the plastic workpiece on an anvil such that the structured contact surface section faces a contact surface of the plastic workpiece,
    positioning the joining tool on the surface-structured workpiece so as to bring the sonotrode into contact with an outer surface of the surface-structured workpiece, the outer surface being opposite to the structured contact surface section, and
    applying a pressure to the sonotrode and/or the anvil perpendicular to the contact surface to hold the workpieces fixed between the anvil and the sonotrode and applying ultrasonic vibrations to the workpieces by the sonotrode for a predetermined period of time, so that softening of the plastic workpiece is induced and the pin-like elements penetrate into the plastic workpiece.

2. The method of claim 1, further comprising removing the pressure and ultrasonic vibrations and retracting of the sonotrode.

3. The method of claim 1, wherein the pin-like elements comprise anchoring elements at their distal ends.

4. The method of claim 3, wherein the anchoring elements of the pin-like elements are designed as conical or spherical or convex or arrow-like or hook-like heads.

5. The method of claim 1, wherein the pin-like elements have a length of 1 to 5 mm in direction perpendicular to the contact surface section.

6. The method of claim 1, wherein the structured contact surface section comprises between 3 to 10 pin-like elements per $cm^2$.

7. The method of claim 1, wherein the surface-structured workpiece is formed of aluminum or an aluminum alloy.

8. The method of claim 1, wherein the surface-structured workpiece is formed of magnesium or a magnesium alloy.

9. The method of claim 1, wherein the surface-structured workpiece is formed of titanium or a titanium alloy.

10. The method of claim 1, wherein the surface-structured workpiece is produced by:
    forming a mixture by mixing a metal powder and/or metal alloy powder with a binder;
    shaping the mixture by injection moulding to give the resulting workpiece at least one structured surface section, with the structured surface section having pin-like elements, and
    sintering the structured workpiece, to form the shaped surface-structured workpiece having a structured surface section.

11. The method of claim 10, wherein the production of the surface-structured workpiece further comprises:
    subjecting the structured workpiece to chemical binder removal; and
    subjecting the structured workpiece which has been subjected to chemical binder removal, to thermal binder removal before sintering the workpiece.

12. The method of claim 1, wherein the plastic workpiece is formed of a fiber reinforced plastic material.

13. A method for connecting a surface-structured workpiece and a plastic workpiece using a joining tool including a sonotrode, said surface-structured workpiece comprising a structured contact surface section, said structured contact surface section comprising pin-like elements extending away from the structured contact surface section, said method comprising:
    positioning the surface-structured workpiece and the plastic workpiece on an anvil such that the structured contact surface section faces a contact surface of the plastic workpiece,
    positioning the joining tool on the surface-structured workpiece so as to bring the sonotrode into contact with an outer surface of the surface-structured workpiece, the outer surface being opposite to the structured contact surface section,
    applying a pressure to the sonotrode and/or the anvil perpendicular to the contact surface to hold the workpieces fixed between the anvil and the sonotrode and applying ultrasonic vibrations to the workpieces by the sonotrode for a predetermined period of time, so that softening of the plastic workpiece is induced and the pin-like elements penetrate into the plastic workpiece; and
    removing the pressure and ultrasonic vibrations and retracting of the sonotrode;
    wherein the pin-like elements have a length of 1 to 5 mm in direction perpendicular to the contact surface section;
    wherein the pin-like elements comprise anchoring elements at their distal ends, wherein the anchoring elements of the pin-like elements are designed as conical or spherical or convex or arrow-like or hook-like heads;
    wherein the structured contact surface section comprises between 3 to 10 pin-like elements per $cm^2$; and
    wherein the surface-structured workpiece is formed of a material selected from the group consisting of: aluminum, aluminum alloy, magnesium, magnesium alloy, titanium and titanium alloy.

14. The method of claim 13, wherein the surface-structured workpiece is produced by:

forming a mixture by mixing a metal powder and/or metal alloy powder with a binder;

shaping the mixture by injection molding to give the resulting workpiece at least one structured surface section, with the structured surface section having pin-like elements; and sintering the structured workpiece, to form the shaped surface-structured workpiece having a structured surface section.

15. The method of claim 14, wherein the production of the surface-structured workpiece further comprises:

subjecting the structured workpiece to chemical binder removal; and subjecting the structured workpiece which has been subjected to chemical binder removal, to thermal binder removal before sintering the workpiece.

16. The method of claim 13, wherein the plastic workpiece is formed of a fiber reinforced plastic material.

* * * * *